(12) United States Patent
Umanskyi et al.

(10) Patent No.: US 9,361,672 B2
(45) Date of Patent: Jun. 7, 2016

(54) IMAGE BLUR DETECTION (71) Applicant: Google Technology Holdings LLC, Mountain View, CA (US)

(72) Inventors: Vitalii Umanskyi, Cupertino, CA (US); Volodymyr Kyiko, Kyiv (UA); Yuriy S. Musatenko, Mountain View, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 321 days.

(21) Appl. No.: 13/849,705

(22) Filed: Mar. 25, 2013

(65) Prior Publication Data

US 2014/0003734 A1 Jan. 2, 2014

Related U.S. Application Data

(60) Provisional application No. 61/615,826, filed on Mar. 26, 2012.

(51) Int. Cl.
*G06T 5/00* (2006.01)

(52) U.S. Cl.
CPC ....... *G06T 5/003* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 5,262,820 A * | 11/1993 | Tamai et al. | ..................... | 396/54 |
| 5,598,145 A * | 1/1997 | Shimotani et al. | ............ | 340/576 |
| 5,719,951 A * | 2/1998 | Shackleton et al. | .......... | 382/118 |
| 6,419,638 B1 * | 7/2002 | Hay et al. | ........................ | 600/558 |
| 8,107,765 B2 | 1/2012 | Hwang et al. | | |
| 2002/0097324 A1 * | 7/2002 | Onuki | .................. | H04N 5/2259 348/208.99 |
| 2004/0001195 A1 * | 1/2004 | Ge | ................ | 356/73.1 |
| 2005/0010106 A1 * | 1/2005 | Lang et al. | ..................... | 600/425 |
| 2005/0030302 A1 * | 2/2005 | Nishi et al. | ..................... | 345/204 |
| 2005/0162516 A1 * | 7/2005 | Loepfe | .................. | G06T 7/0002 348/156 |
| 2005/0243351 A1 * | 11/2005 | Aoyama | ........................ | 358/1.9 |
| 2007/0053590 A1 * | 3/2007 | Kozakaya | ..................... | 382/181 |
| 2009/0161977 A1 * | 6/2009 | Shiraki | .................. | G06T 5/003 382/255 |
| 2012/0249816 A1 * | 10/2012 | Li | ...................... | H04N 5/23212 348/220.1 |
| 2014/0043505 A1 * | 2/2014 | Qian | ............................. | 348/239 |
| 2014/0328550 A1 * | 11/2014 | Liu | ........................ | G06T 5/003 382/282 |

FOREIGN PATENT DOCUMENTS

EP 2073169 A2 6/2009

OTHER PUBLICATIONS

Lokhande R et al.: "Identification of parameters and restoration fo motion blurred images", Applied Computing 2006, 21st Annual ACM Symposium on Applied Computing—Apr. 23-27, 2006—Dijon, France, ACM—New York, NY, USA, vol. 1, Apr. 23, 2006, pp. 301-305.
Marziliano P. et al.: "A no-reference perceptual blur metric", International Conference on Image Processing (ICPIP), IEEE, vol. 3, Sep. 22, 2002, pp. 57-60.
Christine Podilchuk et al: "Face recognition in a tactical environment", Military Communications Conference, 2010—MILCOM 2010, IEEE, Piscataway, NU, USA, Oct. 31, 2010, pp. 900-905.
Patent Cooperation Treaty, International Search Report and Written Opinion of the International Searching Authority for International Application No. PCT/US2013/033689, Aug. 22, 2013, 13 pages.

\* cited by examiner

*Primary Examiner* — Michelle Entezari
(74) *Attorney, Agent, or Firm* — Troutman Sanders LLP; James E. Schutz; Scott D. Barnett (57) ABSTRACT

A system of estimating image blur in digital images stored in a digital file. The disclosed system may calculate a blur value and direction of motion causing image blur based on detected edges within an input image and spectral energy information of the input image in the frequency domain.

24 Claims, 7 Drawing Sheets

| -1 | 0 | 1 |
|----|---|---|
| -2 | 0 | 2 |
| -1 | 0 | 1 |

(a)

| -1 | -2 | -1 |
|----|----|----|
| 0  | 0  | 0  |
| 1  | 2  | 1  |

IMAGE BLUR DETECTION

CROSS REFERENCE TO RELATED APPLICATIONS

This application claims the benefit of U.S. Provisional Application No. 61/615,826, filed Mar. 26, 2012, which is incorporated by reference herein in its entirety.

FIELD OF ART

The present disclosure relates to detecting image blur and more specifically to calculating a percentage of blur and direction of motion causing the blur.

BACKGROUND

Image blur may be caused by a number of reasons, such as improper focus on the subject, motion of the camera and/or motion of the subject during exposure. One method that currently exists for determining whether an image is blurred involves associating a degree of blur with edge spreading in the image, or conversely, with the sharpened edges in the image. Blurred edges seem to get wider as they lose their sharpness. These blurred edges, if observed on a small scale, become thinner and seem to recover their sharpness while the sharp edges will remain the same. Thus, the difference between a "sharp" and "blurry" edge may change due to scale and cause a blurry edge to appear more similar to a sharp edge. This similarity, in effect, results in difficulty associating a degree of blur to the images.

Conventional blur estimation techniques implement single-ended approaches for estimating image blur. Additionally, these techniques are typically universal and usually do not take into account specific features of different classes of subjects, in particular the face of a person. For example, some universal blur estimation techniques define blur on the basis of motion estimation or changes in size of detected subjects in a video. Such universal techniques do not take into account features specific to the type of subject (e.g., facial image) being analyzed and oftentimes produce unreliable results or require lengthy analysis.

SUMMARY

Embodiments disclosed herein relate to systems (and methods) of estimating blur in an image and determining a blur value describing the degree of blur. One example blur estimation technique comprises edge analysis of an input image. Another, more accurate, technique comprises frequency analysis of an input image. The configurations described herein may comprise a combination of both edge analysis and frequency analysis, in a hierarchical fashion, to produce accurate results while keeping processing time at a minimum.

In one embodiment, edge analysis is used for quickly classifying many input images and identifying the remainder for further processing. In one embodiment, edge analysis comprises tracing detected edges along their cross sections in an image and examining the width of the edges to determine whether the input image is blurred. In turn, frequency analysis may be used to further process the remaining input images. In one embodiment, frequency analysis comprises transforming the image from the spatial domain into the frequency domain. The frequency components of the image are plotted and analyzed based on a model for classifying blurry and non-blurry images. In one embodiment, the model may specify groupings of frequency components in different regions that indicate whether a frequency component represents lower detail, detail, or noise in the image. The blur value for the input image may be determined based on the number of frequency components plotted in the different regions using the model.

Additional embodiments relate to augmenting the blue value with a directional component of blurring in the image. Together, the blur value and directional component indicate the degree and direction of blurring in an input image.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Loss of focus, camera motion, and subject motion are common occurrences that give rise to two types of blur in images: out-of-focus blur (e.g., caused by loss of focus on the subject) and motion blur (e.g., caused by motion of the subject or camera). Oftentimes, it is advantageous to detect whether an image is blurry or not prior to post-processing the image. For example, the post processing operations may take the blurriness of the image into account or, alternatively, the image may be discarded based on the degree of blur detected.

In one example embodiment, a blur detection process utilizes a spatial domain based edge analysis of input images to determine the degree of blurring in the image. In another embodiment, the blur detection process utilizes a frequency domain based analysis of input images to determine the degree of blurring in the image.

While edge analysis in the spatial domain may be quite fast, analysis in the spatial domain may have less blur discerning ability than the frequency domain based analysis. However, while analysis in the frequency domain may produce more accurate results, the analysis oftentimes requires more processing time than spatial domain analysis.

In one embodiment, the blur detection process utilizes both frequency domain and spatial domain based approaches in a hierarchical scheme to efficiently and accurately determine the blurriness of images. In many cases, spatial domain based edge analysis may be used for fast decisions, such as whether or not the image is blurry. In turn, frequency domain based analysis may be performed on the subset of blurry, or images that are not accurately classified using edge analysis to determine the degree of blurring in the images. Thus, combining these approaches provides a fast and reliable system for determining the degree of blur in images.

Figure 1A:
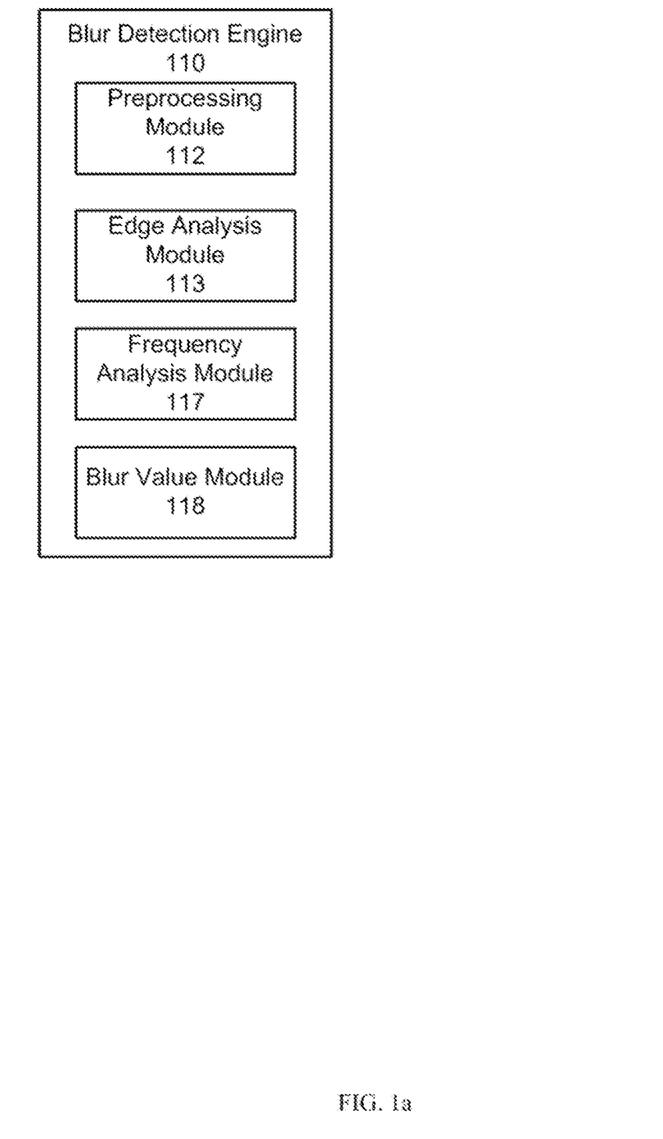
FIG. 1a illustrates an example block diagram of a blur detection engine for performing a blur detection process, according to one embodiment.

FIG. 1a illustrates an example block diagram of a blur detection engine for performing a blur detection process, according to one embodiment. The blur detection engine 110 may be stored in a computer-readable storage medium and executed by a processor of a computer system to perform the functions described herein. The blur detection engine 110 of one embodiment may include a preprocessing module 112, edge analysis module 113, frequency analysis module 117 and blur value module 118.

The preprocessing module 112 receives input images and prepares the images for the blur detection processing performed by the edge analysis module 113 and frequency analysis module 117. The preprocessing module 112 may perform operations for normalizing the image, determining dynamic range of the image and estimating noise in the image. The preprocessing module 122 may additionally determine based on dynamic range and noise in the image, whether to perform the blur detection processing. If the image has too much noise or too low of a dynamic range, the preprocessing module 122 may discard the image. If the preprocessing module 122 determines that the blur detection processing may be performed, further preprocessing steps may be performed to produce more reliable results.

The preprocessing module 112 may normalize the brightness of the input images such that processed images have predefined contrast and standard deviation values. In embodiments comprising input facial images, normalization may also include: key point detection (e.g., eye centers, mouth corners and nose tip) in the facial image using a facial image classifier and in turn, facial image normalization by scale and rotation based on the detected key points. In one embodiment, the detection of key points is accomplished using Haar and local binary pattern features, which may be learned through the use of training images by the AdaBoost method.

Figure 2A:
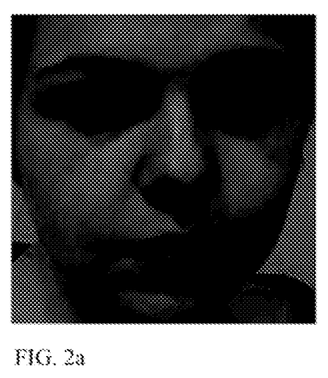
FIGS. 2a and 2b illustrate an example of a low dynamic range image (a) and result of contrast stretching (b) in the image according to one embodiment.
Figure 2B:
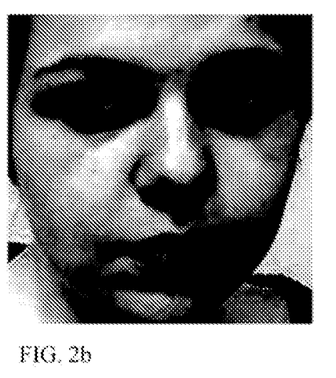

Reliability of determined blur values based on frequency domain representation may depend on the dynamic range of input image pixels intensity values. For example, consider an underexposed face image with low dynamic range. After contrast-stretching due to normalization during preprocessing 102, an underexposed, blurry input image may appear posterized with unnaturally sharp edges. FIG. 2 illustrates an example of a low dynamic range image (a) and result of contrast stretching (b) in the image according to one embodiment.

In the frequency domain, spectral representations of posterized images have a lot of high and middle range frequencies, which may cause incorrect identification of the image as being sharp. Conversely, for a sharp and underexposed face image without contrast stretching during normalization performed by the preprocessing module 112, spectral representations of the image may have a low amount of high and middle frequencies, which may cause incorrect identification of the image as being blurry. Thus, as analyzing low dynamic range images in the frequency domain may provide incorrect results for both blurry and short images, an estimate image dynamic range value may be estimated and used as a confidence level for the blur indicator or value determined for the input image. In some embodiments, when the dynamic range of an input image is lower than some predefined threshold, the image may be rejected.

In an example embodiment, the preprocessing module 112 determines the dynamic range of an input image (e.g., prior to brightness normalization) from the difference between the lightest and the darkest image pixel intensity values. More accurate dynamic range results may be achieved by considering a cumulative distribution of pixel intensities and quantizing the range of pixel intensities.

Figure 3A:
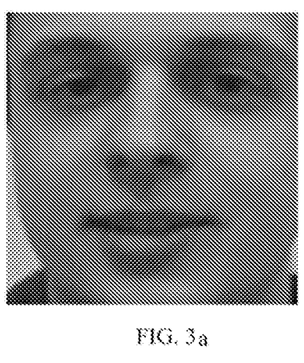
FIGS. 3a and 3b illustrate an example input image (a) and a histogram (b) of the image with depicted dynamic range estimation according to one embodiment.
Figure 3B:
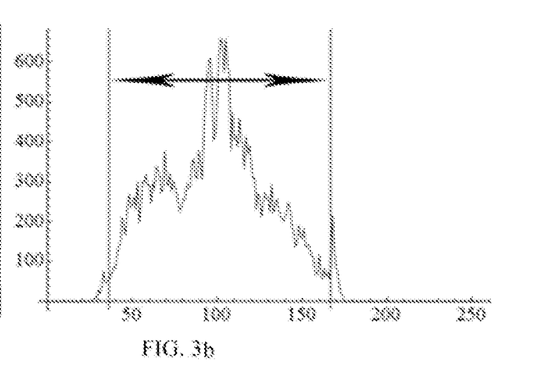

FIG. 3 illustrates an example input image (a) and a histogram (b) of the image with depicted dynamic range estimation according to one embodiment. The image histogram may be normalized and treated as an intensity probability density function. In turn, quantiles of some predefined level of pixel intensity are found (e.g., 1% and 99%) and the difference between the corresponding intensity levels (e.g., 40 and 160 in FIG. 3(b)) is used as an estimation of the dynamic range of the input image FIG. 3(a).

In some embodiments, reliability of edge based analysis performed by the edge analysis module 113 for determining a blur value for an image may depend on the amount of noise in the input image. Specifically, edge detection performed on a noisy image may produce false edges that are otherwise not present in the same image without noise.

In order to reduce the effects of image noise, input images may be passed through a bilateral or Gaussian filter by the preprocessing module 112. In turn, edge detection in the input image may be tuned according to an estimated level of noise in the input image. Generic image noise estimation is quite complicated. However, with a priori knowledge of the type of subject in the input image (e.g. a face) and signal frequency ranges of the object, an accurate noise estimate for the input image may be determined. For example, the preprocessing module 112 may estimate noise by examining the tail of the frequency spectrum, which contains the highest frequencies in the image. In some embodiments, when the estimated noise level in an input image is higher than some predefined threshold, the image may be rejected.

Figure 4:
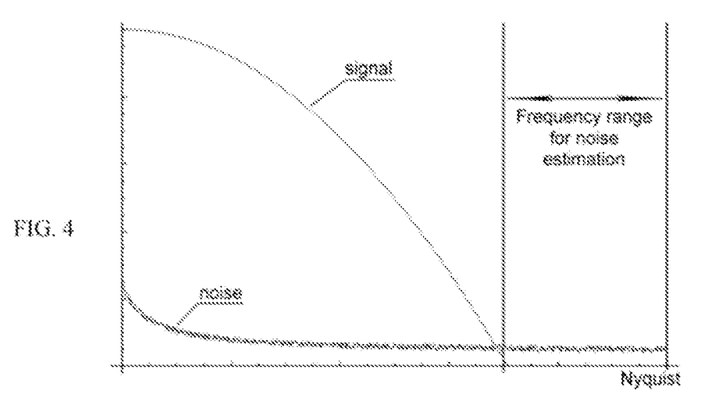
FIG. 4 illustrates an example signal verses noise spectrum and the tailing frequency range used for noise estimation according to one embodiment.

FIG. 4 illustrates an example signal verses noise spectrum and the tailing frequency range used for noise estimation according to one embodiment. In one embodiment, (a) 2D power spectrum of input image is calculated by taking absolute values of transforms of the image and; (b) from the obtained 2D power spectrum a directionally independent radially averaged 1D spectrum is calculated as mean value of all possible directional power spectra, and (c) for predefined frequency range, e.g., as defined by a pair of cutoff frequencies (see FIG. 4) powers (amplitudes) weighted average value is calculated, which is used as an estimated noise level.

The edge analysis module 113 detects edges in the input image and provides an initial estimated quality value for the input image based on analysis of the detected edges. In one embodiment, the edge analysis module 113 utilizes a linear filter to detect edges in the input images. The edge analysis module 113 analyses the detected edges based on associated edge parameters to determine the estimated quality value for the input image. In turn, the edge analysis module 113 may assign the input image to a bucket based on the quality value. The buckets may classify the input image as blurry, non-blurry or undecided. Undecided images may be further processed by the frequency analysis module 117 using more accurate methods to determine whether the input image is blurry, and degree of blurring in the image. Blurry images may be discarded or further processed by the frequency analysis module 117 to more accurately determine the degree of blurring in the image.

In one embodiment, the edge analysis module 113 uses a Sobel operator as the liner filter for the detection of edges. The Sobel operator calculates the gradient components in the horizontal and vertical directions of the image intensity at each point by convolving the image with kernels. The kernels of the Sobel operator may be tuned based on an estimated level of noise determined for the input image.

Figure 5:
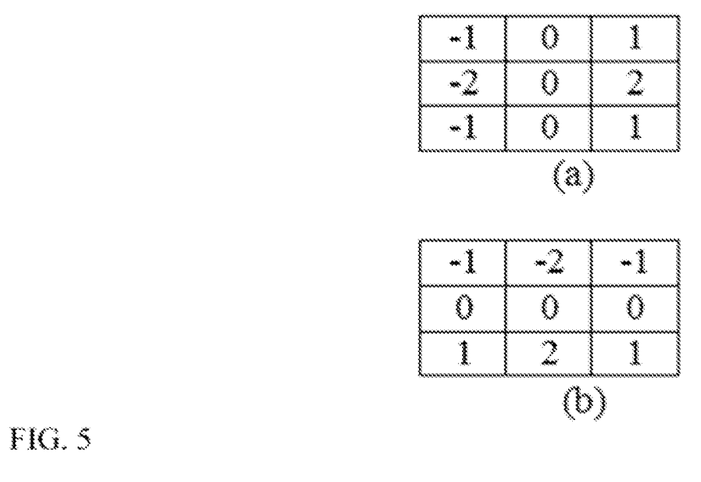
FIGS. 5a and 5b illustrate example 3×3 Sobel operator kernels which are convolved with the input image to calculate horizontal (a) and vertical (b) image intensity gradients according to one embodiment.

FIG. 5 illustrates example 3×3 Sobel operator kernels which are convolved with the input image to calculate horizontal (a) and vertical (b) image intensity gradients according to one embodiment. Suppose that each edge in the input image represents a set of pixels with sharp changes in image brightness (large gradient components), which often correspond to boundaries of the subject in an image. Each edge pixel can be examined on the basis of a set of given neighboring pixels that manifest as either a boundary or inner edge pixel. Starting from each boundary edge pixel, a line segment is traced in the direction of the image intensity gradient (along edge cross section), corresponding to this edge pixel, until the boundary edge pixel on the opposite side of the edge curve. In this way, edge parameters such as the width of the traced line segment described by the boundary pixel, and the average image intensity gradient or standard deviation of the gradient along the traced line segment are determined for identified edges in the input image. From the edge parameters associated with the identified edges in the input image, a total number of boundary edge pixels, average edge widths and intensity gradients, which describe the blurriness of the image, are determined. Typically, the average width of edges in blurred image exceeds the width of edges in non-blurred images and the average gradient in blurred image is less than in non-blurred images.

Figure 6:
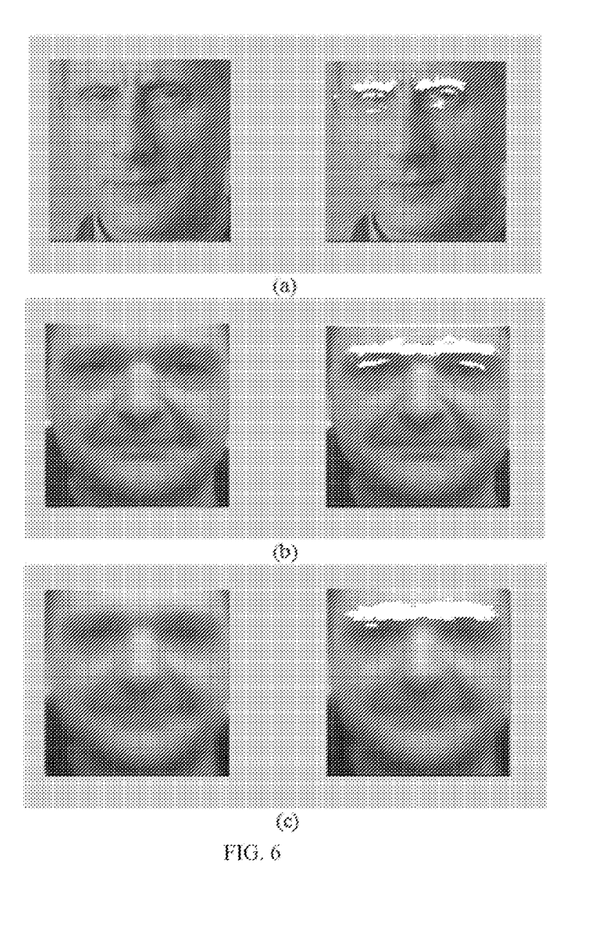
FIGS. 6a, 6b, and 6c illustrate examples of horizontal edges in eyes regions transposed on corresponding sharp (a), non-blurred or light blurred (b) and blurred (c) facial images according to one embodiment.

FIG. 6 illustrates examples of horizontal edges in eyes regions transposed on corresponding sharp (a), non-blurred or light blurred (b) and blurred (c) facial images according to one embodiment. In edge analysis of facial image, FIG. 6 illustrates examples of detected edges corresponding to upper parts of approximately horizontal black regions in the example input images a, b and c, the gradient of the image intensity in vertical direction in each edge pixels has a positive value. In one embodiment, edge pixels having a positive vertical gradient $G_v(x,y)$ value that exceeds a preset threshold between light and dark areas (e.g., 40 intensity units: $G_v(x,y) > \theta_v, \theta_v = 40$ and ratio between vertical and horizontal gradients exceeding a preset threshold (e.g., $$1.5 \text{ times: } \frac{G_v(x, y)}{G_h(x, y)} \geq \alpha, \alpha = 1.5).$$

Other threshold values may be used.

The positive gradient value and horizontal gradient value may be calculated by the edge analysis module 112 using the filters illustrated in FIG. 5. For example, consider that each horizontal edge represents some column of edge pixels which have the same coordinate "x". The number and averaged vertical image intensity gradient of these pixels is described below as the width and value (magnitude) of the correspondent edge. Horizontal edges processing comprises defining: (a) the total number of edges and (b) their average width and value in the image.

In one embodiment, the processing of horizontal edges comprises a calculation of the vertical $G_v(x,y)$ and horizontal $G_h(x,y)$ gradient in the input image by application of a linear filter, such as the Sobel operators illustrated in FIG. 5, to the input image and in turn, determining horizontal edges $E_h(x,y)$ in the input image where:

$$E_h(x, y) = \begin{cases} G_v(x, y), & \text{if } G_v(x, y) > \theta \text{ and } G_v(x, y) \geq \alpha |G_h(x, y)|; \\ 0, & \text{otherwise.} \end{cases}$$

$\theta$ is a predefined threshold and $\alpha$ may range, in one embodiment, between 1 and 2 depending on the source of received input images and which value provides best results.

The upper boundary edge pixels are detected in horizontal edges: these are the edge pixels of the input image, in which upper neighbors are not edge pixels. Neighborhood of the pixel may be defined in terms of 4-connectivity: thus, for example, upper neighbor of pixel (x, y) is (x,y+1), and lower neighbor is (x,y−1).

Each edge may be traced from left to right in the input image to define the edge. For positions along the edge, an edge width may be calculated as distance in pixels in vertical direction between edge lower and upper boundary pixels.

In a geometrically normalized face image, eyes centers have fixed positions along a horizontal line, i.e., they have the same "y" coordinate. The horizontal edges in this region of input facial images constitute a part of all edges in the image (especially in its upper part) and their analysis alone may suffice for image blur estimation.

With edge lines formed in the input image, the estimated quality value, or blurriness value of the image may be based on the total number of detected edge lines and their average width and gradient value. For example, the average widths and values of edges for sharp (a), light blur (b) and blurred (c) face images in FIG. 6 are, respectively: (a) 3.12 and 92; (b) 5.08 and 70; and (c) 7.03 and 62. Thus, with the increasing blur, edge parameters such as average width of edges increases and the value of edges decreases. The edge analysis module 112 assigns the image to a bucked based on the edge parameters.

The frequency analysis module 117 generates a representation of the input image in the frequency domain and analysis the representation to determine the degree of blurring in the image and direction of motion blur in the image. In one embodiment, the frequency analysis module 117 utilizes a Fast Fourier Transform (FFT) for generating the representation of the image. Other embodiments may utilize other known orthogonal transforms, such as a Discrete Cosine Transform (DCT).

The FFT decomposes input image into a two-dimensional spectrum. In one embodiment, a convenient representation of the input image comprises rendering the spectrum as a graph or plot, where amplitude (power) of the frequency component is encoded as pixel intensity (the higher power–the lighter pixel intensity). The center of the graph for the 2D spectrum corresponds to the DC component of input image brightness, or the average input image brightness. Thus, pixels near the center correspond to low frequencies while those further from center correspond to higher frequencies (increasing with distance from the center). In turn, ranges of frequencies plotted in the graph may be grouped into regions.

Figure 7:
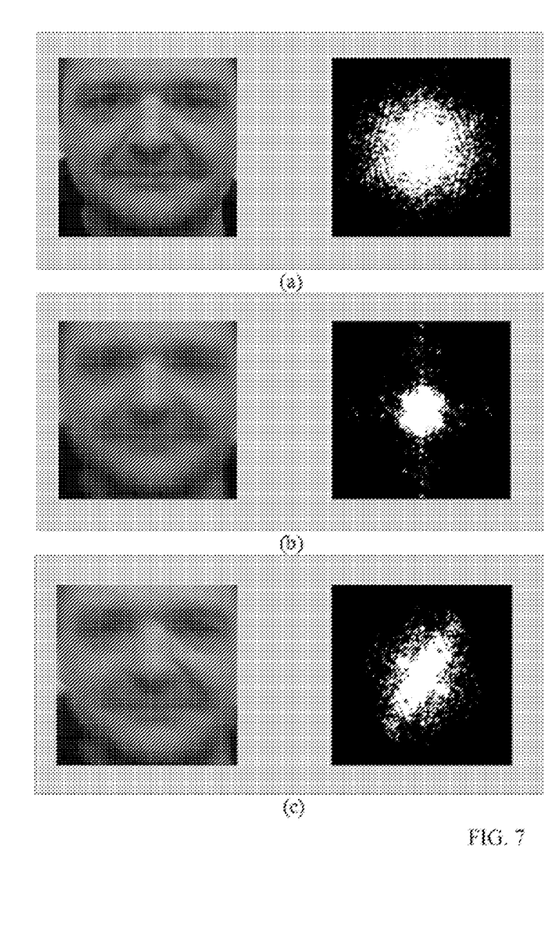
FIGS. 7a, 7b, and 7c illustrate examples of non-blurred (a), out-of-focus blurred (b) and motion blurred face images (c) and respective 2D power spectrums of these images according to one embodiment.

FIG. 7 illustrates examples of non-blurred (a), out-of-focus blurred (b) and motion blurred face images (c) and respective 2D power spectrums of these images according to one embodiment. Additionally, FIG. 8c further illustrates a line passing through the center of spectrum that corresponds to set of frequencies having similar spatial directions (e.g., horizontal lines correspond to sinusoids in the horizontal direction, and vertical lines—to sinusoids in the vertical direction, etc). The 2D frequency spectrum includes frequency components with respect to horizontal and vertical edges of the image and frequency components with respect to slanting edges of the image as a combination of the horizontal and vertical edges. Blurred images are characterized by a lack of detail, and thus, have a large number of low frequency components. Details in the frequency domain are represented by the existence of high and mid frequencies. Thus, it is possible to separate blurred images FIG. 7(b), 7(c) from sharp ones FIG. 7(a) by analyzing the 2D spectrum of the frequency components.

FFT based analysis of the image, as described above, may comprise obtaining 2D spectrum of the frequency components through FFT (or DCT) transformation of the input image and subsequently include taking the logarithm of amplitudes of frequency components followed and spatially smoothing the frequency components. In one embodiment, spatially smoothing the frequency components comprises applying a Gaussian kernel smoothing filter. In other embodiments, other types of filters may be used.

Figure 8:
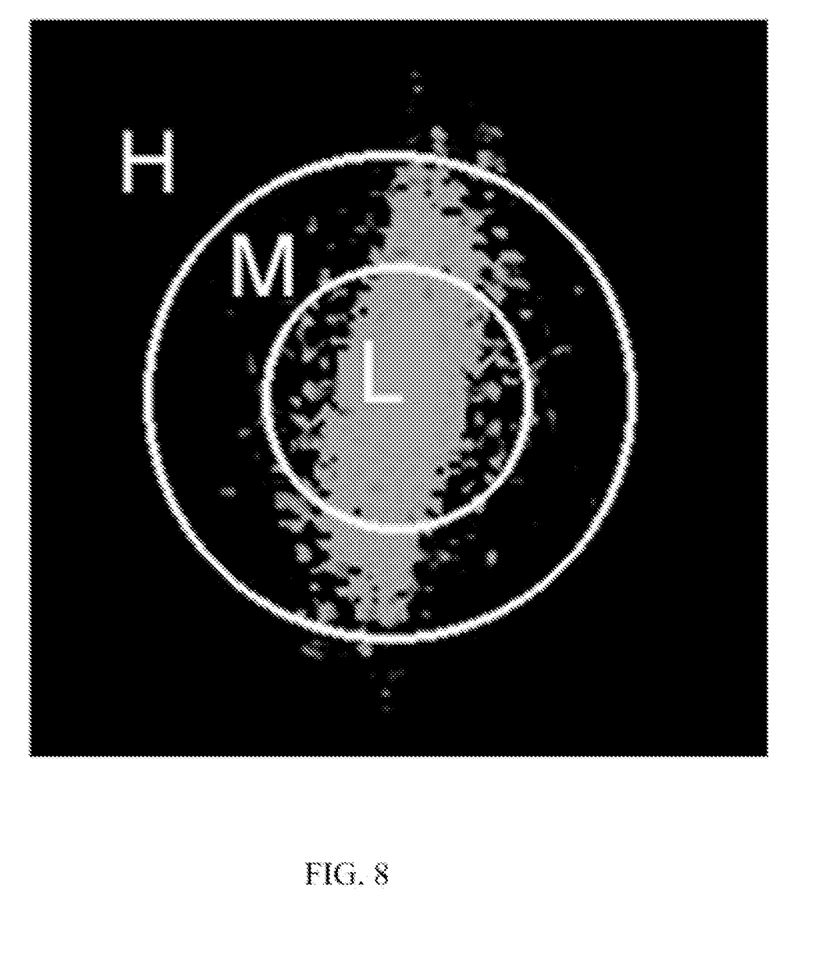
FIG. 8 illustrates splitting of the image spectrum into low (L), mid (M) and high (H) frequency regions according to one embodiment.

In turn, the frequency analysis module 117 may group plotted frequency components (e.g., as shown in FIGS. 7(a)-7(c)) into high, mid and low frequency regions. FIG. 8 illustrates splitting of the image spectrum into low (L), mid (M) and high (H) frequency regions according to one embodiment. In one embodiment, the thresholds that define circular boundaries of the regions are determined through machine learning based on a training set of images classified as blurry and non-blurry. For example, the binarizing of frequency components' amplitudes with a preset threshold defining a region boundary may be used such that each of the amplitudes equals either to 1 ("white" value) if it exceeds the threshold or to 0 ("black" value) otherwise to assign the frequency components to a region. By measuring a distance from center of the graphed frequency components to the boundary of the set of positive ("white") binarized amplitude values of frequency components in a region along each of sampled directions, the count of frequency components within the region and corresponding to the sampled direction may be measured.

Referring again to FIG. 8, an example of splitting 2D spectrum into high (H), mid (M) and low (L) frequency regions and direction along which the frequency components align themselves are illustrated. The low (L) frequency region corresponds to general face shape and frequencies of this region have high amplitudes for both blurred and sharp images. The middle (M) frequency region corresponds to face details, for blurred face images frequencies from this region are almost absent, while sharp ones contain lots of frequencies from this region. The high (H) region represents mostly high frequency noise. Other embodiments may include additional regions for classifying frequency components. Typically, different non-blurred faces tend to have similar power spectrum distributions. A comparison between the spectrum for non-blurred faces with the spectrum of an input image allows for an estimation of blur in the input image.

In one embodiment, the plot of frequency components is divided into three regions for classifying the plotted frequency components. The division of the plot into the regions may be carried out by adjusting the thresholds corresponding to difference regions in accordance with a known model. For example, a learning process using a set of blurred and non-blurred face images may establish the known model.

In one embodiment, a learning process determines an inner threshold and outer threshold (lowTresh and highTresh) that respectively classify each frequency component in a L, M or H region. The number of frequency components classified in the different regions indicates whether the image is burred or not. As shown in FIG. 8, these thresholds define circular boundaries for regions such that persistently blurred images have many frequency components in the first region (L). For example, after binarization of frequency components amplitudes, the L region mainly comprises positive ("white") frequency components and two other regions mainly comprises null ("black") ones.

For non-blurred images, the second region (M) comprises many positive ("white") frequency components, and thus, has a higher count of frequency components in the M region which indicates greater detail in the image. Images with some blurring, in turn, comprise some positive ("white") frequency components, though less than non-blurred images (and additionally, more null ("black") frequency components than non-blurred images).

The blur value module 118 determines a blur indicator describing blur in the input image based on the information determined by the edge analysis module 113 and/or the frequency analysis module 117. For example, a blur indicator may describe both the overall degree of blurriness of the input image, as determined from the center distance to the frequency components (or counts of frequency components in the different regions) and the direction and degree of motion blur in the input image, as determined from the center distance to the frequency components (or counts of frequency components in the different regions) associated with the direction along which the frequency components align themselves. The blur indicator may also take into account the estimated blur and image quality estimation determined during edge analysis.

In one embodiment, the blur value module 118 determines the number of frequency components, or count, in each region (i.e., L, M, and H). Based on the known model, the count determined for each region may be used to determine the degree of blurriness for the image. The calculation may be refined using the distance between the center of the plot and the frequency components. In addition to determining the raw count of frequency components in each region L, M, and H (or center distances to frequency components), a direction of blurring (and corresponding value) in the image may be determined by sampling counts in different directions. For example, a number of directions, or ranges, in degrees may be sampled to determine motion blur:

$$B(\alpha) = \begin{cases} 0, & d(\alpha) < lowThresh \\ \frac{d(\alpha) - lowThresh}{highThresh - lowThresh}, & lowThresh \leq d(\alpha) \leq highThresh. \\ 1, & d(\alpha) > highThresh \end{cases}$$

The lowThresh and highThresh are thresholds that split spectrum into high, mid and low frequency areas, α is an angle representing the selected direction and d(α) is the distance from center of the spectrum to the edge of the spectrum (e.g., the "white" region or a defined boundary). A normalized output value (e.g., ranging from 0-100) of estimated blur may be calculated from:

$$B = 100 \cdot \frac{\sum_{\alpha \in A} \gamma(B(\alpha))}{\|A\|}, \gamma(x) = x^c, c = const,$$

$$A = \left\{ \frac{k\pi}{n} \,\middle|\, k = \overline{0, n} \right\}, n = const,$$

where A is a set of angles, along which directional blur values were estimated, and c and n are predefined constants. Constant c may be used to apply more weight for higher frequencies within a range. One example value, c=0.3, provides good results. Constant n may be used to specify the number of directions to sample. One example value, n=32, provides sufficiently accurate resolution.

As shown in FIG. 7 and FIG. 8, motion blur corresponds to an elongated ("white") plot of frequency components and the estimated direction of this elongation through the central point of the spectrum specifies the direction of motion blur in the input image, which is perpendicular to direction of this elongation. Thus, the angle of motion blur direction in the image itself can be estimated by formula:

$$\alpha_{blur} = \underset{\alpha \in A}{\operatorname{argmin}} B(\alpha).$$

Confidence level of the determined angle (or degree of motion component in blur) can be estimated as blob elongation by formula $$\beta_{blur} = \frac{\max_{\alpha \in A} B(\alpha)}{\min_{\alpha \in A} B(\alpha)}.$$

Figure 9:
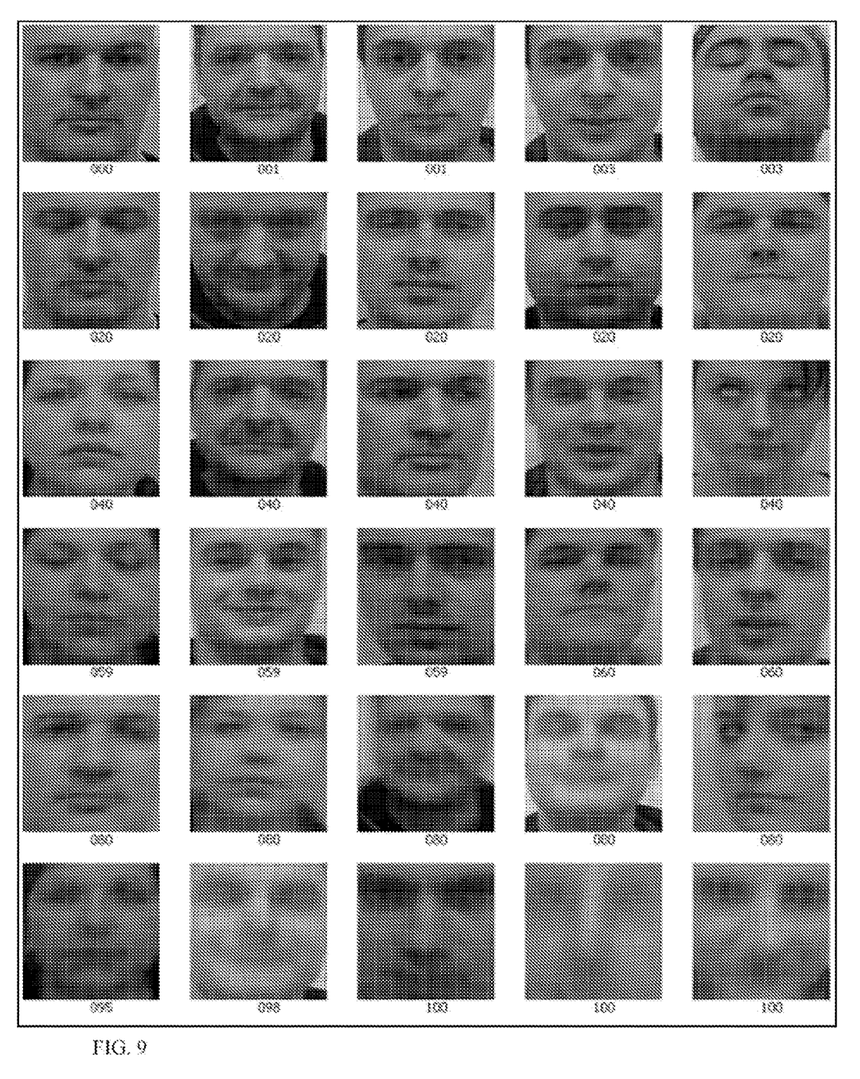
FIG. 9 illustrates examples of blur values for corresponding images determined using frequency analysis, according to one embodiment.

FIG. 9 illustrates examples of blur values for corresponding images determined using frequency analysis, according to one embodiment. The blue value module 118 may determine corresponding blur values for the input image based on the plotted frequency components resulting from frequency analysis. In addition to the illustrated blur values, the blur value module 118 may additionally determine the blur indicator for each image, which includes a directional component describing the direction of motion blur in the image. In another embodiment, the blur value includes, or is based in part, on both the spatial based edge analysis and frequency domain analysis.

Blur Detection Process

Figure 1B:
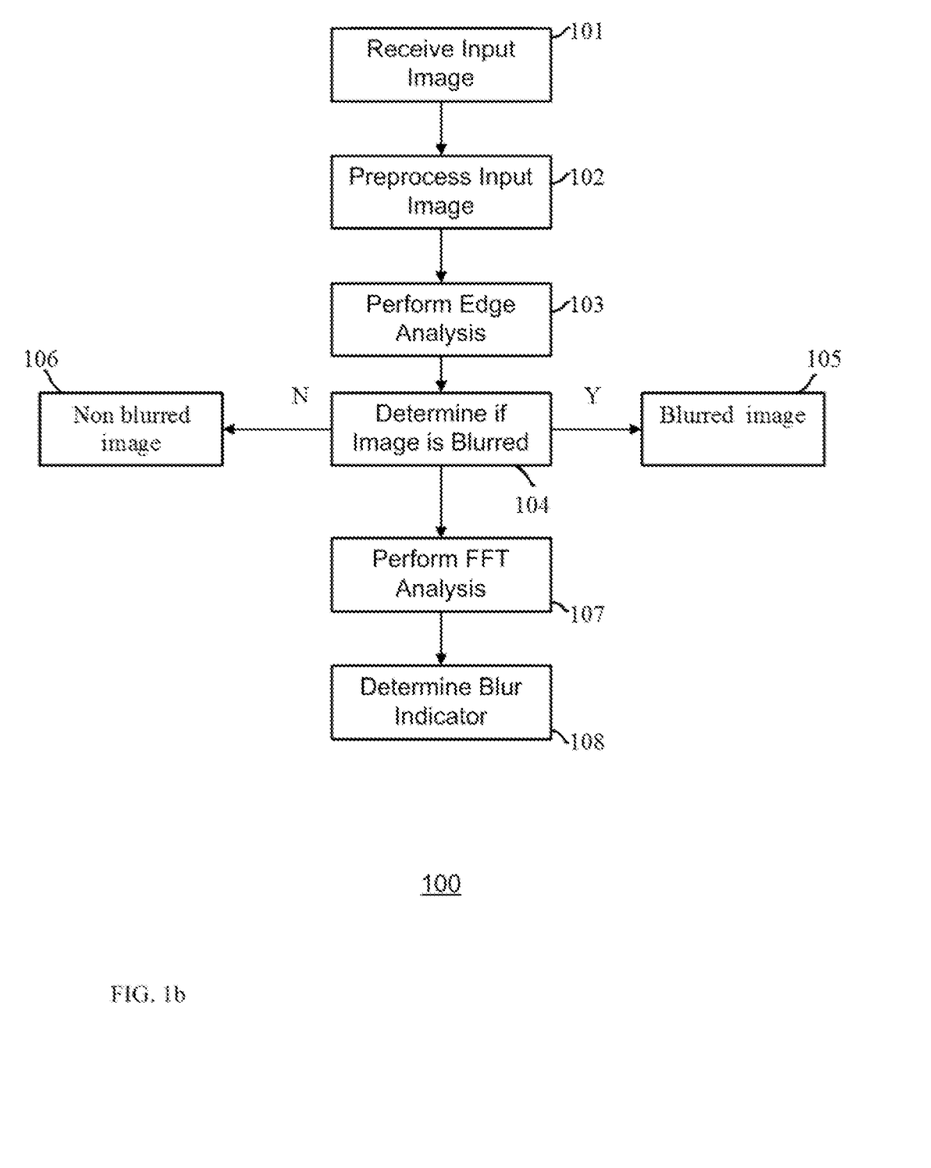
FIG. 1b illustrates an example method of performing a blur detection process to calculate a blur value for an image, according to one embodiment.

FIG. 1b illustrates an example method of performing a blur detection process to calculate a blur value for an image, according to one embodiment. In one embodiment, the blur detection engine 110 illustrated in FIG. 1a is used to perform the blur detection process 100 illustrated in FIG. 1b. As shown in FIG. 1b, an input image 101 (e.g., detected facial image) is received. The facial image may optionally be localized and extracted from an original image which may contain multiple facial images.

The input image is optionally preprocessed 102. Preprocessing 102 may include image brightness normalization, facial image normalization, determination of dynamic range and noise estimation. Thus, each input image may have predefined contrast and standard deviation values as a result of image brightness normalization and facial images have a similar orientation and size. Images having insufficient dynamic range or a high degree of noise may be rejected. In some embodiments, input images are passed through a filter (e.g., a Gaussian filter) to reduce noise in the image.

With preprocessing 102 of the input image complete, edge analysis 103 is performed to detect edges in the input image. In one embodiment, a linear filter such as a Sobel operator is used for detection of edges. The Sobel operator calculates the gradient components in the horizontal and vertical directions of the image intensity at each point by convolving the image with kernels. The kernels of the Sobel operator may be tuned based on the estimated level of noise determined for the input image during preprocessing 102. The Sobel operators may be convolved with the input image to calculate intensity gradients which identify edges in the image.

Edge parameters such as the width of the identified edges are described by boundary pixels, and the average image intensity gradient or standard deviation of the gradient along the identified edges in the input image. From the edge parameters associated with the identified edges in the input image, a total number of boundary edge pixels, average edge widths and intensity gradients, which describe the blurriness of the image, are determined. Typically, the average width of edges in blurred image exceeds the width of edges in non-blurred images and the average gradient in blurred image is less than in non-blurred images.

In a geometrically normalized face image, eyes centers have fixed positions along a horizontal line, i.e., they have the same "y" coordinate. The horizontal edges in this region of input facial images constitute a part of all edges in the image (especially in its upper part). In some embodiments, edge analysis 103 may involve restricting edge detection and analysis to this region for faster blur estimation in the input image.

With edge lines formed in the input image, the estimated blurriness 104 of the image may be based on the total number of detected edge lines and their average width and value. With increasing blur, average width of edges increases and the value of edges decreases. The average width and values of edges determined for the input image may be used to determine 104 if the image is blurred and assign the input image to a corresponding bucket. A minimal set of (3) buckets may classify images as non-blurred 106, blurred 105 and all other (e.g., ill-defined) images, the latter being processed further using a frequency domain based analysis 107. Blurred images 105 may also be processed further for more accurate blur detection results.

Blur estimation 104 based on edge analysis 103 is close to human vision, which often relies upon visible edge transitional information to evaluate the quality of an image. Though edge analysis 103 is close to human vision, representation of the image in the frequency domain may provide increased reliability in out-of-focus blur estimation. Further, the frequency based approach described below may also estimate motion blur due to object or camera motion.

As described above, edge analysis 103 classifies the input image in one of the three buckets; blurred 105, non-blurred 106 and ill-defined. In one embodiment, ill-defined input images may be further analyzed in the frequency domain 107 to determine the degree of blurring in the image and the direction of motion blur. In one embodiment, frequency analysis 107 comprises transforming the input image with a Fast Fourier Transform (FFT) and analyzing the representation of the image in the frequency domain (based on the FFT) to accurately determine blurring and motion blur in the input image. The FFT analysis 107, however, may be replaced with some other known orthogonal transforming means, such as a Discrete Cosine Transform (DCT).

Thus, in the proposed hierarchical scheme, edge based blur analysis 103 in the spatial domain may be used for fast decision making 104 for bucketing a majority of received images, while slower but more accurate frequency based approaches may be reserved for remaining (e.g., ill-defined), more difficult cases not easily classified as blurred 105 or non-blurred 106.

In one embodiment, the FFT analysis 107 decomposes input image into a 2D spectrum. One convenient representation of the input image comprises rendering the spectrum as a plot of frequency components, where amplitude (power) of the frequency component is encoded as pixel intensity (the higher power–the lighter pixel intensity). Blurred images are characterized by the lacks details, and thus, have a large number of low frequency components. The center of the graph for the 2D spectrum corresponds to the DC component of input image brightness, or the average input image brightness. Thus, pixels near the center correspond to low frequencies while those further from center correspond to higher frequencies (increasing with distance from the center).

In turn, frequency components plotted in the graph may be grouped into regions based on their distance from the center of the plot, or DC component. For example, as shown in FIG. 8, the 2D image spectrum may be split into low (L), mid (M) and high (H) frequency. In one embodiment, the thresholds that define circular boundaries of the regions are determined from a model trained based on a training set of known images classified as blurry and non-blurry.

The amount of blur in the image may be quantified by determining a blur indicator 108 for the image. The blur indicator may be based on the determined regions and counts of frequency components associated with the regions, e.g., the degree to which high, medium, and low frequency components manifest within the image (i.e., based on distance from the center) and the degree to which high, medium, and low frequency components manifest in a given direction.

The degree to which high, medium and low frequency components manifest within the image may provide an overall indication of the blurriness of the image. Specifically, images with few higher (e.g., medium and above in a model having low, medium and high regions) frequency components may have substantial blurring. For example, in comparing the plots of frequency components for FIG. 7(a) and FIG. 7(b), most frequency components plotted for FIG. 7(b) are clustered together at the center, which would corresponding to a low frequency region and indicate a low degree of detail in the image. In contrast, many frequency components plotted for FIG. 7(a) have a greater distance from the center (i.e., in higher frequency regions) than those in FIG. 7 (b), which indicates a higher degree of detail in the image corresponding to the plot in FIG. 7(a). Hence, as shown, the image in FIG. 7(a) has minimal blurring (high detail) while the image in FIG. 7(b) has significant blurring.

The degree to which high, medium, and low frequency components manifest in a given direction may provide an indication of whether the image exhibits motion blurring. Motion blurring may cause frequency components of the image to manifest in higher detail regions (e.g., medium and above in a model having low, medium and high regions) even though there is significant blurring in the image. However, when motion blur occurs in the image, the plotted frequency components occur along a line through the center, rather than within in a general radius of the center. Specifically, while higher frequency components may occur in a motion blurred image, they are confined to a direction corresponding to the motion blur. For example, in comparing the plots of frequency components for FIG. 7(a) and FIG. 7(c), many frequency components plotted for FIG. 7(c) are generally grouped around a line through the center, which indicates motion blur in a direction perpendicular to the plotted line in the image. In contrast, the frequency components plotted for FIG. 7(a) at a given radius from the center are generally evenly dispersed around the plot. Hence, as shown, the image in FIG. 7(a) has minimal motion blurring (high detail) while the image in FIG. 7(c) has significant motion blurring.

Thus, the determined blur indicator 108 for each image may, in addition to the illustrated blur values, include a directional component that describes the direction of motion blur in the image. In another embodiment, the blur value includes, or is based in part, on both the spatial based edge analysis 103 (e.g., the initial blur estimation) and frequency domain analysis 107. The blur indicator 108 may be displayed in association with the corresponding image.

The proposed method of FIG. 1b may be used for blur detection in any image, but may be used more efficiently when training based on a specific image type, or subject is performed to adjust the aforementioned parameters and threshold values accordingly.

The foregoing description of the embodiments has been presented for the purpose of illustration; it is not intended to be exhaustive or to limit aspects of the disclosure to the precise forms described herein. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments described may also relate to an apparatus for performing the operations herein. For example, one embodiment of an apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments described may also relate to a product that is produced by a computing process described herein. Such a product may comprise information resulting from a computing process, where the information is stored on a non-transitory, tangible computer readable storage medium and may include any embodiment of a computer program product or other data combination described herein.

What is claimed is:

1. A method of blur detection in an input image comprising:
    preprocessing, by a processor, the input image to normalize brightness of the input image;
    estimating, by the processor, a quality value of the input image based on edge parameters responsive to detecting an edge in the input image, wherein estimating the quality value of the input image comprises classifying the input image as at least one of blurred, non-blurred, and ill-defined;
    transforming, by the processor, responsive to the estimated quality value of the input image, the input image into a plot of frequency components, the frequency components representing the input image in the frequency domain;
    processing, by the processor, the plot of frequency components based on a model, the model splitting the plot of frequency components into regions representative of detail in the input image;
    calculating, by the processor, based on the plot of frequency components, an indicator that quantifies an amount of blur throughout the input image;
    wherein the estimated quality value of the input image is used to determine a reliability of the indicator that quantifies the amount of blur throughout the input image; and
    discarding the input image in response to determining that the reliability of the indicator fails to satisfy a predetermined threshold.

2. The method of claim 1, wherein:
    the brightness normalization transforms pixel intensities of pixels in the input image such that the mean and standard deviation of the pixel intensities concord with predefined values; and
    the image quality estimation is based in part on a dynamic range of image pixel intensities.

3. The method of claim 1, wherein estimating the quality value of the input image comprises estimating the amount of blur in the input image based on edge parameters comprising a determined average width and magnitude of the detected edges in the input image by analyzing cross section parameters.

4. The method of claim 1 further comprising:
    responsive to classifying the input image as ill-defined, transforming the input image for analysis in the frequency domain.

5. The method of claim 1, wherein transforming the input image into the plot of frequency components comprises applying a Fast Fourier Transforms (FFT) to the input image.

6. The method of claim 5, wherein the method further comprises:
    taking respective logarithms of amplitudes of the frequency components;
    calculating a binary spectrum by smoothing of the plot of frequency components based on a threshold value; and
    splitting the binary spectrum into three regions by adjusting thresholds defining circular boundaries of the regions.

7. The method of claim 1, wherein calculating the indicator that quantifies the amount of blur throughout the input image comprises determining a direction of motion corresponding to blurring in the input image.

8. The method of claim 7, wherein determining the direction of motion corresponding to blurring in the image comprises:
    defining a set of directions from a center of the plot of frequency components;
    measuring a distance along each direction in the set of directions to a boundary of the binary spectrum's region that contains positive values; and
    determining, based on the distances, a direction associated with each distance, and regions, a resulting indicator that quantifies the amount of blur throughout the input image.

9. The method of claim 1, wherein the input image comprises a detected facial region, the method further comprising:
    determining key point positions such as eye centers, nose tip and mouth corners within said facial region; and
    normalizing the input image based on a scaling, rotation and cropping of the input image to a predefined size based on the determined key points.

10. The method of claim 1, further comprising training the model based on sets of known blurred images and known non-blurred images.

11. The method of claim 1, wherein the blur indicator is based in part on the edge parameters.

12. The method of claim 1, further comprising providing the indicator that quantifies the amount of blur throughout the input image for display in association with the input image.

13. An electronic device comprising:
    memory comprising executable instructions; and
    a processor operatively connected to the memory, the processor configured to execute the executable instructions in order to effectuate a method comprising:
        preprocessing an input image to normalize brightness of the input image;
        estimating a quality value of the input image based on edge parameters responsive to detecting an edge in the input image, wherein estimating the quality value of the input image comprises classifying the input image as at least one of blurred, non-blurred, and ill-defined;
        transforming, responsive to the estimated quality value of the input image, the input image into a plot of frequency components, the frequency components representing the input image in the frequency domain;
        processing the plot of frequency components based on a model, the model splitting the plot of frequency components into regions representative of detail in the input image; and
        calculating, based on the plot of frequency components, an indicator that quantifies an amount of blur throughout the input image;

wherein the estimated quality value of the input image is used to determine a reliability of the indicator that quantifies the amount of blur throughout the input image.

14. The electronic device of claim 13, wherein:
preprocessing the input image to normalize brightness of the input image comprises transforming pixel intensities of pixels in the input image such that the mean and standard deviation of the pixel intensities concord with predefined values; and
estimating the quality value of the input image is based in part on a dynamic range of image pixel intensities.

15. The electronic device of claim 13, wherein estimating the quality value of the input image comprises estimating the amount of blur in the input image based on the edge parameters further comprising a determined average width and magnitude of the detected edges in the input image by analyzing cross section parameters.

16. The electronic device of claim 13, wherein the processor is configured to execute the executable instructions in order to effectuate the method further comprising:
responsive to classifying the input image as ill-defined, transforming the input image for analysis in the frequency domain.

17. The electronic device of claim 13, wherein transforming the input image into the plot of frequency components comprises applying a Fast Fourier Transform (FFT) to the input image.

18. The electronic device of claim 17, wherein the processor is configured to execute the executable instructions in order to effectuate the method further comprising:
taking respective logarithms of amplitudes of the frequency components;
calculating a binary spectrum by smoothing of the plot of frequency components based on a threshold value; and
splitting the binary spectrum into three regions by preliminarily adjusting thresholds defining circular boundaries of the regions.

19. The electronic device of claim 13, wherein calculating the indicator that quantifies the amount of blur throughout the input image comprises determining a direction of motion corresponding to blurring in the input image.

20. The electronic device of claim 19, wherein determining the direction of motion corresponding to blurring in the input image comprises:
defining a set of directions from a center of the plot of frequency components;
measuring a distance along each direction in the set of directions to a boundary of the binary spectrum's region that contains positive values; and
determining, based on the distances, a direction associated with each distance, and regions, a resulting indicator that quantifies the amount of blur throughout the input image.

21. The electronic device of claim 13, wherein the input image comprises a detected facial region, and wherein the processor is configured to execute the executable instructions in order to effectuate the method further comprising:
determining key point positions such as eye centers, nose tip and mouth corners within said facial region; and
normalizing the input image based on a scaling, rotation and cropping of the input image to a predefined size based on the determined key points.

22. The electronic device of claim 13, wherein the processor is configured to execute the executable instructions in order to effectuate the method further comprising:
training the model based on sets of known blurred images and known non-blurred images.

23. The electronic device of claim 13, wherein the processor is configured to execute the executable instructions in order to effectuate the method further comprising:
providing the indicator that quantifies the amount of blur throughout the input image for display in association with the input image.

24. The electronic device of claim 13, wherein the processor is configured to execute the executable instructions in order to effectuate the method further comprising:
discarding the input image in response to determining that the reliability of the indicator fails to satisfy a predetermined threshold.

* * * * *